R. E. ROSEWARNE.
FRICTION CLUTCH.
APPLICATION FILED MAR. 26, 1913.
1,163,690.
Patented Dec. 14, 1915.
2 SHEETS—SHEET 1.
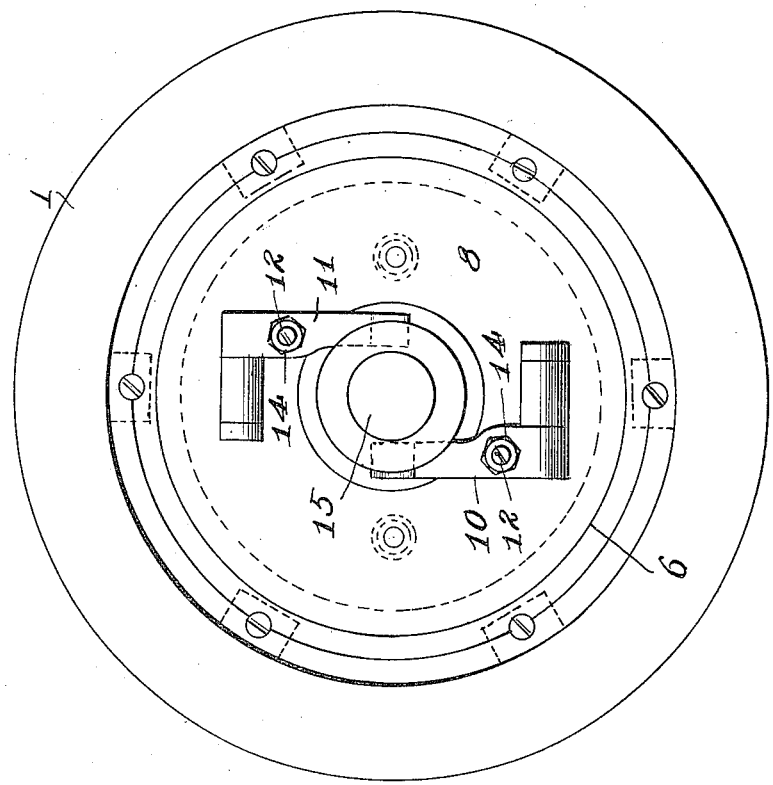
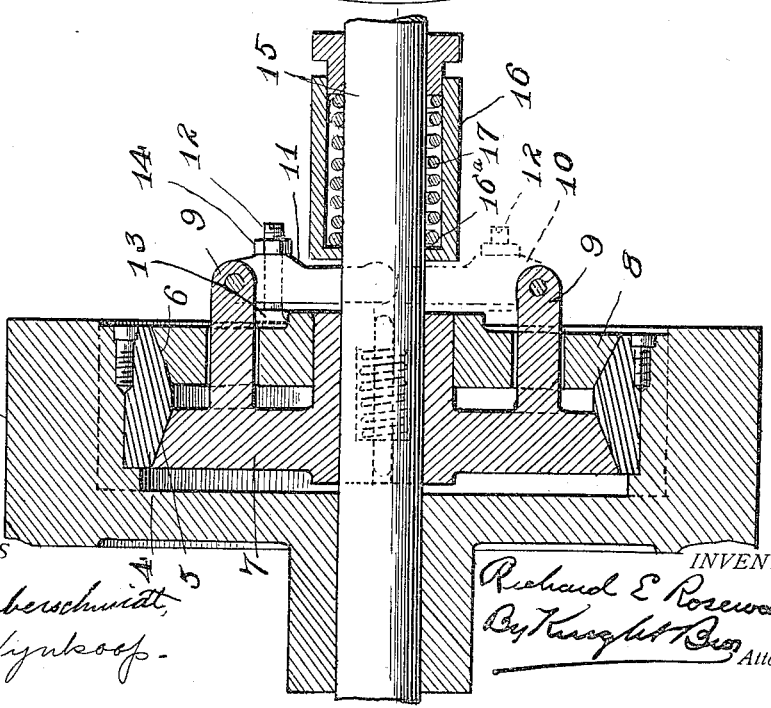

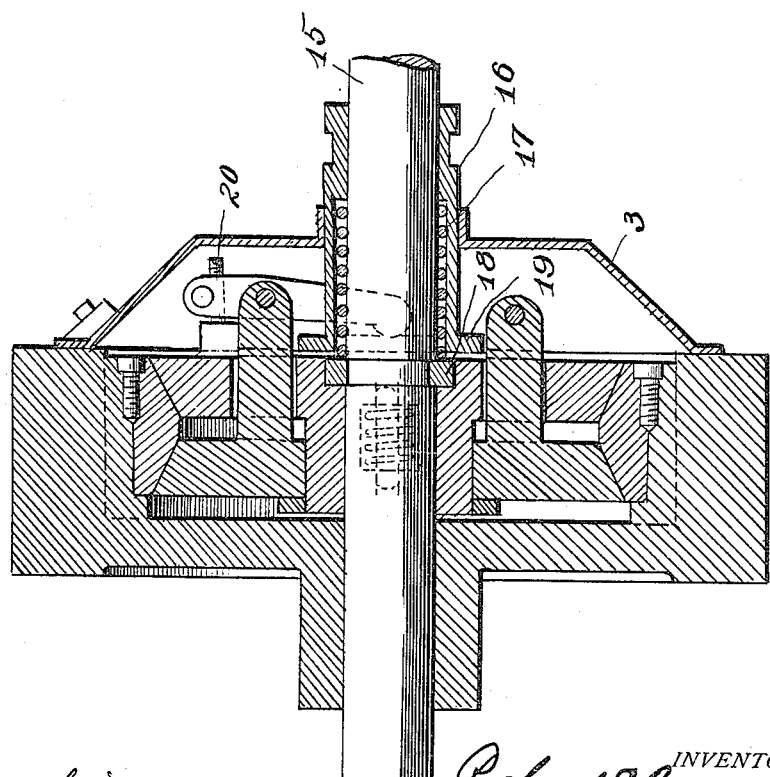

UNITED STATES PATENT OFFICE.

RICHARD E. ROSEWARNE, OF COVINGTON, KENTUCKY, ASSIGNOR TO THE MILLER, DU BRUL & PETERS MFG. CO., OF CINCINNATI, OHIO, A CORPORATION OF OHIO.

FRICTION-CLUTCH.

1,163,690.  Specification of Letters Patent.  Patented Dec. 14, 1915.

Application filed March 26, 1913. Serial No. 757,012.

*To all whom it may concern:*

Be it known that I, RICHARD E. ROSE-WARNE, a citizen of the United States, residing at Covington, in the county of Kenton and State of Kentucky, have invented certain new and useful Improvements in Friction-Clutches, of which the following is a specification.

This invention relates to friction clutches generally, but I have shown it embodied in a clutch of substantially the construction shown in my Patent No. 1,049,604, dated January 7, 1913, to which reference may be had for a detail description of the clutch members.

There is a weakness in all friction clutch construction due to the small amount of wear possible on their faces before their full efficiency is gone and to the limited provision and means to compensate for wear, and to the system of engaging the clutch faces.

The object of my invention is to provide compensating means, whereby all wear may be compensated for on the bearing points of the operating levers, which may be adjusted independently of the other clutch elements, said means being carried either by the operating levers or by one of the clutch members and serving to bring the other clutch member carrying the levers into frictional contact.

Another object of my invention is to provide a clutch for automobiles where a powerful, long lasting and easily operated clutch is necessary; and with these and other objects in view my invention consists of the parts and combinations of parts as will be hereafter more fully set forth.

In the drawings—Figure 1 is an axial section; Fig. 2, an end view of one embodiment of my improved clutch; Fig. 3 is a view similar to Fig. 1 showing the parts inclosed in an oil chamber; Fig. 4 is an enlarged detail view showing a modification.

In the construction shown in Figs. 1 and 3, the clutch is disposed in the fly wheel 1 where it is easily accessible and in which it is securely held to the rim of the fly wheel. As shown in Fig. 3, I provide a casing 3 forming an oil reservoir, whereby the parts may run in an oil bath.

4 represents a flange carried by the fly wheel and provided with inclined frictional faces 5 and 6.

7 and 8 represent movable clamping flanges adapted to be forced toward each other and made to clamp the clamping flange 4 between them by means hereinafter described. The member 7 is provided with arms 9 which project through openings in the friction member 8 and are adapted to slide therein.

10 and 11 are two proportioned levers fulcrumed on the arms 9 which are carried by the inner friction member 7, said levers being provided with adjustable footings 12 secured in screw threaded openings passing through said levers, said footings bearing on abutments 13 formed on the outer friction member 8 against which the adjustable footings bear in the operation of the clutch.

14 are clamp nuts secured on the adjustable lever footings 12.

15 is a shaft.

The sleeve 16 has a flanged abutment 16ª for a spring and is forced by the spring 17 toward the clutch and pressing the free ends of the clutch levers 10 and 11, throws them and their adjustable footings inwardly and draws the clutch faces together.

Referring to Fig. 3, a collar 18 is set in the shaft 15 to form an abutment for the spring 17 which operates the slide sleeve 16 which engages the ends of the clamping levers, said sleeve having a flanged head 19 which engages the levers, moving them outwardly, thus swinging the adjustable footings 20 inwardly and drawing the clutch faces together.

In Fig. 4, the adjustable footing 12ª is in the form of a set screw secured to the outer friction member.

From the above, it will be seen that these adjustable abutments for the clutch operating levers may be used for initial setting and for independent adjustments for setting the levers to their working pressure for the friction clutch so that the maximum efficiency of the clutch may be maintained at all times by the adjustment of said footings.

It is apparent that this type of adjustable footings or take-up for each lever may be used on any form of clutch which carries a footing for the operating lever.

In the particular embodiment of Figs. 1 to 4, the levers do not extend as true radii, being offset from their connection 9, but they nevertheless lie perpendicular to the plane of the axis of the shaft and thereby insure a long lasting, powerful and easily operated clutch which may be very gradually applied by a direct axial thrust.

What I claim is:

1. A friction clutch comprising axially movable clamping members, an intervening member to be clamped, arms carried by one of the clamping members and extending through openings in the other clamping member, oscillating levers fulcrumed on one clamping member through the medium of said arms lying on the outer side of and bearing against the other clutch member and extending parallel to radii of the clutch inward toward the axis of the clutch, and means imparting a direct axial thrust to the inner ends of said levers for developing the clutching pressure.

2. A friction clutch comprising axially movable clamping members, an intervening member to be clamped, arms carried by one of the clamping members and extending through openings in the other clamping member, oscillating levers fulcrumed on one clamping member through the medium of said arms lying on the outer side of and bearing against the other clutch member and extending parallel to radii of the clutch inward toward the axis of the clutch, and means imparting a direct axial thrust to the inner ends of said levers for developing the clutching pressure, the inner ends of the arms extending laterally past the shaft.

3. A friction clutch comprising two clamping members, and a fixed clamping disk between said members, centrally extending and axially movable levers and bearings for said levers on one of said members, said bearings extending through openings on the other of said members, contacting studs axially adjustable between said levers and the other of said members, whereby said levers may be operated by a direct axial thrust for swinging the bearing points of the levers axially inward.

4. A friction clutch comprising two clamping members and a fixed clamping disk between said members, centrally extending and axially movable levers and bearings for said levers on one of said members, said bearings extending through openings on the other of said members, contacting studs mounted in said levers parallel to the axis of the clutch and axially adjustable between said levers and the other of said members whereby said levers may be operated by a direct axial thrust for swinging the bearing points of the levers axially inward.

The foregoing specification signed at Cincinnati, Ohio, this 22 day of March, 1913.

RICHARD E. ROSEWARNE.

In presence of two witnesses:
NAPOLEON DU BRUL,
W. J. HUNTER.

Copies of this patent may be obtained for five cents each, by addressing the "Commissioner of Patents, Washington, D. C."